(12) United States Patent
Junke et al.

(10) Patent No.: US 8,733,777 B2
(45) Date of Patent: May 27, 2014

(54) CORRUGATION BELLOWS OF A TRANSFER BETWEEN TWO PIVOTABLY INTERCONNECTED VEHICLES

(71) Applicant: Hübner GmbH, Kassel (DE)

(72) Inventors: Volker Junke, Felsberg (DE); Andre Goebels, Kassel (DE); Lingzhi Li, Shanghai (CN)

(73) Assignee: Hübner GmbH & Co. KG, Kassel (DE)

( * ) Notice: Subject to any disclaimer, the term of this patent is extended or adjusted under 35 U.S.C. 154(b) by 0 days.

(21) Appl. No.: 13/748,128

(22) Filed: Jan. 23, 2013

(65) Prior Publication Data

US 2013/0127135 A1 May 23, 2013

Related U.S. Application Data

(63) Continuation-in-part of application No. 13/014,107, filed on Jan. 26, 2011, now Pat. No. 8,382,144.

(30) Foreign Application Priority Data

Feb. 5, 2010 (EP) .................................... 10001203
Feb. 19, 2010 (EP) .................................... 10001703

(51) Int. Cl.
*B60D 5/00* (2006.01)

(52) U.S. Cl.
USPC .............................. 280/403; 280/400; 105/18

(58) Field of Classification Search
USPC ..................................... 280/403, 400; 105/18
See application file for complete search history.

(56) References Cited

U.S. PATENT DOCUMENTS

| 473,954 A | 5/1892 | Perry |
| 1,056,407 A | 3/1913 | Forsyth |
| 1,063,607 A * | 6/1913 | Schroyer ......................... 105/18 |
| 1,450,007 A | 3/1923 | Pflager |
| 2,193,156 A | 3/1940 | Antoine |
| 4,452,465 A | 6/1984 | Bourke |
| 4,570,964 A | 2/1986 | Tatay et al. |
| 4,905,607 A | 3/1990 | Wanneroy |
| 5,033,395 A | 7/1991 | Bechu et al. |
| 5,060,578 A | 10/1991 | Carimentrand |
| 5,456,186 A | 10/1995 | Hubner |
| 5,546,866 A | 8/1996 | Koch |
| 5,785,372 A | 7/1998 | Glatzmeier et al. |
| 5,884,565 A | 3/1999 | Koch |
| 5,953,998 A * | 9/1999 | Petit ................................. 105/18 |
| 6,085,403 A | 7/2000 | Petit |

(Continued)

FOREIGN PATENT DOCUMENTS

DE 202005008670 U1 10/2006
EP 0558295 A1 9/1993
FR 914247 A 10/1946

*Primary Examiner* — Joseph M Rocca
*Assistant Examiner* — Marlon Arce
(74) *Attorney, Agent, or Firm* — Gifford, Krass, Sprinkle, Anderson & Citkowski, P.C.

(57) ABSTRACT

A corrugation bellows for a transfer between two articulated vehicles has a plurality of corrugations which are generally U-shaped in cross-section. Two adjacent corrugations are connected together by a frame. The corrugations may have a web interconnecting two limbs, with the web being substantially planar in a substantially neutral state of the bellows. The limbs extend at right angles to the web in a substantially neutral state of the bellows.

19 Claims, 3 Drawing Sheets

(56) References Cited

U.S. PATENT DOCUMENTS

| | | |
|---|---|---|
| 6,196,132 B1 | 3/2001 | Hubner |
| 2004/0075239 A1 | 4/2004 | Call |
| 2010/0025961 A1 | 2/2010 | Tabellini et al. |
| 2010/0075085 A1* | 3/2010 | Koukal .................. 428/36.1 |

* cited by examiner

CORRUGATION BELLOWS OF A TRANSFER BETWEEN TWO PIVOTABLY INTERCONNECTED VEHICLES

CROSS-REFERENCE TO RELATED APPLICATIONS

This application is a continuation-in-part of U.S. patent application Ser. No. 13/014,107, filed Jan. 26, 2011, which claims priority of European Patent Applications EP 10 001 203.8, filed Feb. 5, 2010, and EP 10 001 703.7, filed Feb. 19, 2010, the entire contents of which are incorporated herein by reference.

FIELD OF THE INVENTION

The invention relates to a corrugation bellows of a transfer between two vehicles which are articulated together, comprising a plurality of U-shaped corrugations, wherein two adjacent corrugations are connected together by a frame and wherein the corrugation of U-shaped cross-section has two limbs and a web connecting the limbs

BACKGROUND OF THE INVENTION

A corrugation bellows of the kind stated in the introduction is, as part of a transfer between two pivotably interconnected vehicles, sufficiently well known from the prior art and does not need to be explained in more detail at this point.

Corrugation bellows of that kind are, as has already been explained, used for bridging over the spacing between two pivotably interconnected vehicles. It is known that the arrangement of the bellows between two pivotably interconnected vehicles is carried out directly in the region of the actual corridor and surrounds the corridor in rectangular manner. In this regard, a spacing of between 30 and 50 centimeters is present between the outer circumferential surface of this transfer bellows and the outer wall of the vehicle body. This has the consequence, particularly in the case of rapid travel, that significant turbulence may be formed, which considerably increases the air resistance.

In order to provide a remedy here it is conceivable to attach the bellows of a transfer in the region of the outer contour of the vehicle, i.e. in the ideal case, the outer side of the bellows forms together with the outer wall of the vehicle a substantially continuous surface. This bellows extending at the outside in the region of the vehicle wall is in a given case part of a double corrugation bellows, wherein the optional other part of this bellows is disposed directly around the transfer bridge and in a given case also around the articulation joint. This means that in such a case there is a not insignificant spacing between the inner bellows and the outer bellows.

The disadvantage of use of a conventional corrugation bellows in the region of the outer wall of the vehicle, thus the arrangement of a bellows substantially equal in contour with the outer wall of the carriage, is that such a bellows exhibits not inconsiderable amounts of turbulence directly at the bellow surface, which is due to the fact that the individual corrugation elements of such a bellows have an arched shape in the region of the web. The reason for the arched shape of the webs resides in the fact that in the neutral setting of the bellows, thus in straight travel of the vehicle, the bellows is under slight pressure in a longitudinal direction between the vehicles, wherein the curved shape of the webs arises substantially as a result.

SUMMARY OF THE INVENTION

The object of the invention accordingly consists in providing a corrugation bellows of the kind stated in the introduction, which exhibits a lesser degree of formation of turbulence on the outer side of the bellows.

In order to fulfill the object, it is proposed, in accordance with the invention, to construct the web between the limbs to be planar so that in the case of a web of substantially planar form the limbs and the web extend at a right angle to one another in a substantially neutral state of the bellows. A corrugation with a planar web can, for example, be produced in the course of a shape-imparting process.

In this connection it is provided in accordance with a first variant that the material thickness of the web is formed to be greater than the material thickness of the limbs, wherein the material of the web and limbs is identical.

According to another variant it is provided that the material of the web is stiffer than the material of the limbs, so that here, too, in the case of the web of substantially planar form the limbs and the web extend at a right angle to one another in a substantially neutral state of the bellows. Alternatively, it can be provided to both form the material of the web to be stiffer and to increase the material thickness. This is always against the background that the web should remain substantially rigid, i.e. if the material of the web in the initial state forms a plane, such a planar form of the web is maintained when the web forms, in conjunction with the limbs, the corrugation of a corrugation bellows. For travel movements in which such a bellows must be able to flex this means that a lengthening of the bellows for bending, pitching and rolling movements is provided substantially solely by spreading apart of the individual corrugations in the region of the limbs. As such, the webs retain their substantially planar form when the corrugation is in a partially extended setting, corresponding to normal travel movements of the vehicle. In the prior art it is the case that due to the arched construction of the web, through a lengthening of the web this similarly contributes—just by its lengthening—to a change in shape of the bellows in longitudinal direction.

Advantageous features with respect to the two forms of embodiment can be inferred from the subclaims.

In some variants, the material thickness the web is increased by having several fabric laminations or fabric layers; it is clear therefrom that for increasing stability several laminations of a fabric may be arranged one above the other, wherein the individual fabric laminations are provided on their mutual facing sides with a coating, for example of an elastomer, e.g., a silicon. A further possibility for increasing stiffness consists in plastically deforming the fabric layer of the bellows material of the web. In the case of a plastic deformation of the fabric, which consists of individual warp and weft threads, the interstices between the warp and weft threads are filled. The material is thereby intrinsically stiffened. Such a plastically deformed fabric is then coated on at least one side with synthetic material in order to form the bellows, which is produced therefrom, to be sealed.

According to a further variant of the invention, the web may be sewn and/or glued in an overlapping manner to the limbs. In this connection, the limbs advantageously have in the transition to the web a projection which extends substantially at a right angle to the limb and which is connected with the web, for example by gluing or sewing. It is thereby achieved that the web itself does not have to extend up to the region of the limb, which would inevitably lead to an arched shape of the web.

According to another embodiment of the invention, the corrugation bellows has a plurality of corrugations, each of which are generally U-shaped in cross-section, wherein two adjacent corrugations are connected together by a frame. Each of the corrugations has two limbs and a web connecting the limbs. Each of the webs is substantially planar and the limbs extend at right angles to the web when the bellows is in a substantially neutral state. The webs of the corrugations cooperate to provide a generally planar surface when the bellows is in a substantially neutral state.

According to a further embodiment, the corrugation bellows has a plurality of corrugations, each of which are generally U-shaped in cross-section, wherein two adjacent corrugations are connected together by a frame. Each of the corrugations has two limbs and a web connecting the limbs. Each of the webs is substantially planar and the limbs extend at right angles to the web when the bellows is in a substantially neutral state. Each of the corrugations have at least one layer of mesh material disposed in the limbs and web, with the mesh covered by an elastomer material. The webs of the corrugations cooperate to provide a generally planar surface when the bellows is in a substantially neutral state.

DETAILED DESCRIPTION OF THE INVENTION

Figure 1:
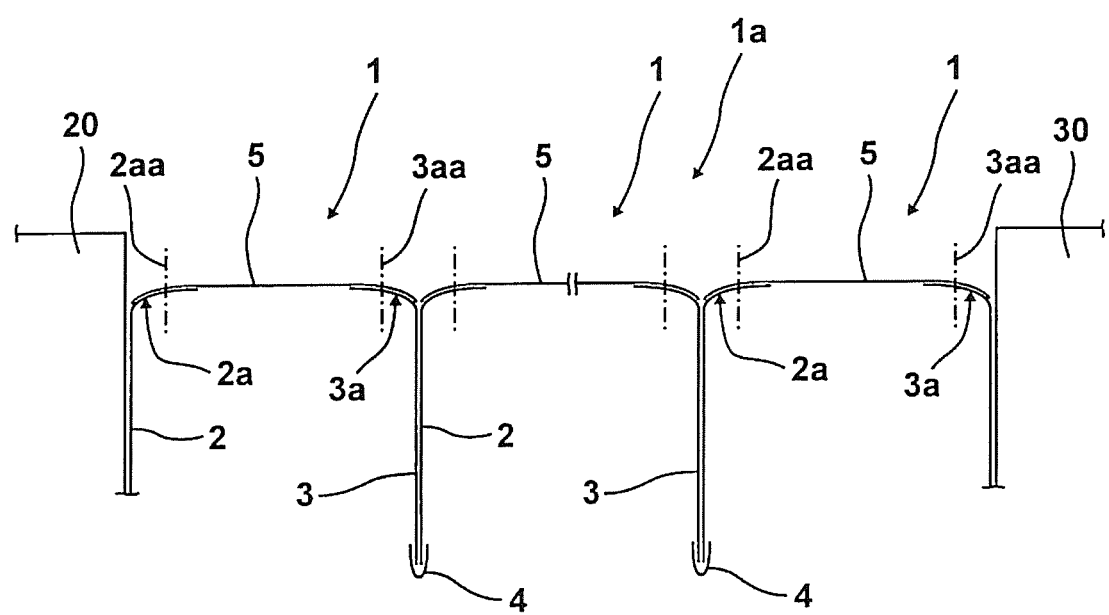
FIG. 1 is a cross-sectional view of a first embodiment of a corrugation bellows in a neutral state.

FIG. 1 schematically shows a detail of a first embodiment of a corrugation bellows 1a between two pivotably interconnected vehicles 20, 30. The individual corrugations 1 of the bellows 1a have limbs 2 and 3 and the limbs 2 and 3 are each held by a bellows frame 4. The limbs 2, 3 each have at the upper end a projection 2a, 3a, wherein the web 5 is connected with the limbs at 2aa, 3aa on the projection, in particular on the projection 2a, 3a extending substantially at right angles to the limbs 2, 3. The connection of the web with the projections can in that case be carried out not only from the inside, but also from the outside.

The material of the web 5 may, in accordance with a first variant, be thicker than the material of the limbs, which leads to an increase in the stiffness of the web. The stiffness of the web may also be increased by a suitable material selection for the web with increased stiffness by comparison with the material for the limbs 2, 3. Alternatively, an intrinsically stiff material for the web can be selected, wherein the stiffness of the material of the web is greater than that of the material of the limbs.

However, it is also conceivable to vulcanise the corrugation entirely in one shape and in this regard to predetermine the shape of the web in rectangular form, thus with a planarly extending web.

Figure 2:
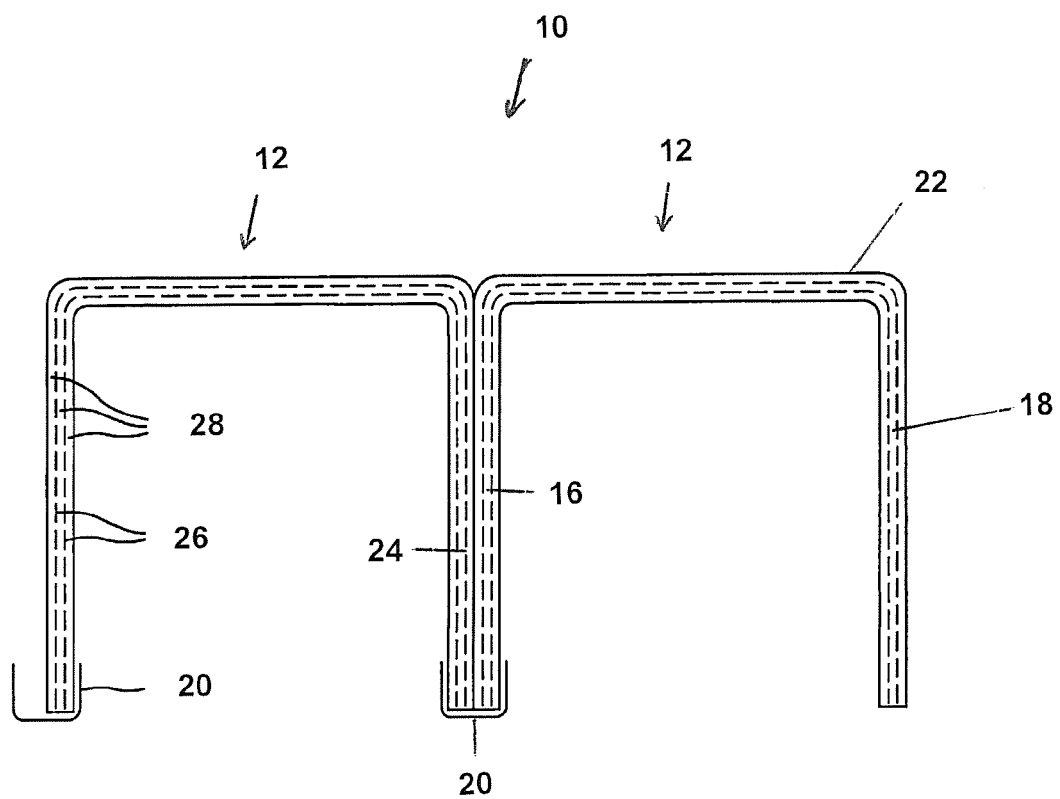
FIG. 2 is a cross-sectional view of a second embodiment of a corrugation bellows in a neutral state.
Figure 3:
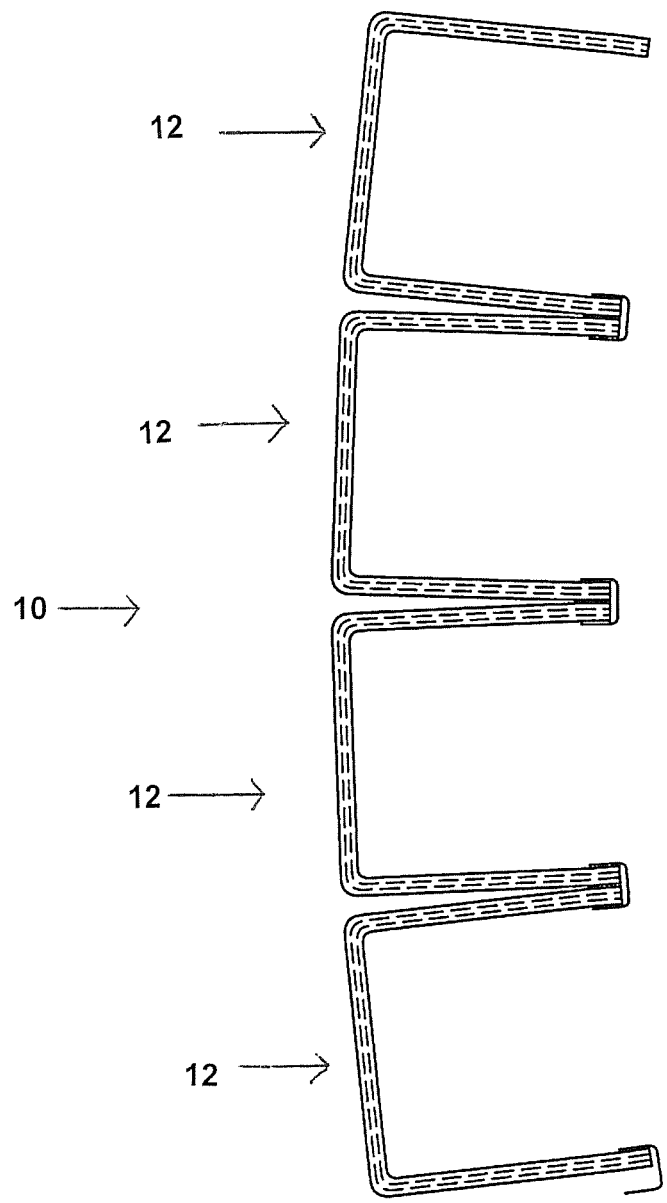
FIG. 3 is a cross-sectional view of the second embodiment of the corrugation bellows in a partially extended state.

FIGS. 2 and 3 illustrate a second embodiment of a corrugation bellows 10. FIG. 2 illustrates only two corrugations 12, while FIG. 3 illustrates four corrugations 12. It is understood that a complete corrugation bellows may have any number of corrugations.

Each corrugation 12 preferably has the same form, so only one of the corrugations in FIG. 2 is labelled. The corrugation 12 has a web 14 interconnecting limbs 16 and 18. The corrugations 12 are interconnected to each other by a frame 20 that joins together the inner ends of adjacent limbs.

In the illustrated embodiment, the web 14 of each corrugation 12 is substantially planar, as shown. As such, the corrugations cooperate to provide a generally planar outer surface 22, when the bellows 10 is in the neutral state as shown in FIG. 2. As shown, the limbs 16 and 18 are each substantially parallel and extend a right angles to the web 14 when the bellows in the neutral state. As such, the limbs 16 and 18 are substantially parallel to each other in the neutral setting. Also, the limb 16 is parallel to and substantially flush with the adjacent limb 24 of the adjacent corrugation.

The corrugations 12 of the bellows 10 may be constructed in accordance with any of the prior discussion herein. In a further embodiment, the corrugations each have at least one layer of mesh material that is disposed both in the web and in the limbs. This may be a continuous layer that extends through substantially the entirety of one limb, continuously into the web, and continuously through substantially the entirety of the other limb. In the illustrated embodiment, two layers of mesh material 26 are disposed continuously throughout the limbs and web of the corrugation, with the two layers being parallel to each other. The layers may have a small spacing between them. The mesh layers are covered and interconnected by an elastomer material 28. The elastomer material preferably forms the inner and outer faces of the corrugations. In some embodiments, this elastomer may be CSM (chlorosulfonated polyethylene synthetic rubber), EPDM (ethylene propylene diene Monomer [M-class] rubber) or a silicone rubber. The combination of mesh layers and elastomer material may be vulcanized, preferably in a cast or a mold.

FIG. 3 illustrates the corrugation bellows 10 in what is defined herein as a partially extended state. This corresponds to the normal movement of interconnected vehicles, such as a high speed train. As will be appreciated by those of skill in the art, the bellows 10 may be extended farther than this partially extended state, such as during low speed movement of a train, but the illustrated partially extended state corresponds to normal or typical movements such as during high speed travel. As shown, the webs remain substantially planar in the partially extended state, with the limbs being spread apart from their neighboring limb.

As will be clear to those of skill in the art, the herein described and illustrated embodiments of the present invention may be altered in various ways without departing from the scope or teaching of the present invention. It is the following claims, including all equivalents, which define the scope of the invention.

The invention claimed is:

1. A corrugation bellows for a transfer disposed between two pivotably interconnected vehicles, said corrugation bellows comprising:
   a plurality of corrugations, each of which are generally U-shaped in cross-section, wherein two adjacent corrugations are connected together by a frame;
   each of the generally U-shaped corrugations having two limbs and a web connecting the limbs; and
   each of the webs being planar and the limbs extending at right angles to the web when the bellows is in a neutral state;
   wherein the webs of the plurality of corrugations cooperate to provide a generally planar surface when the bellows is in a neutral state.

2. A corrugation bellows in accordance with claim 1, wherein:
   each of the limbs is substantially planar when the bellows is in a neutral state.

3. A corrugation bellows in accordance with claim 1, wherein:
   the limbs and web each have a thickness in the range of 2 to 4 millimeters.

4. A corrugation bellows in accordance with claim 1, wherein:
the limbs and web have the same thickness.

5. A corrugation bellows in accordance with claim 1, wherein:
the material of the web and limbs is identical.

6. A corrugation bellows in accordance with claim 1, wherein:
the limbs and web include an elastomer material, the elastomer material being CSM or EPDM or a silicone rubber.

7. A corrugation bellows in accordance with claim 5, wherein:
the corrugations are vulcanized.

8. A corrugation bellows in accordance with claim 1, wherein:
the webs each remain substantially planar when the bellows is in a partially extended state.

9. A corrugation bellows for a transfer disposed between two pivotably interconnected vehicles, said corrugation bellows comprising:
a plurality of corrugations, each of which are generally U-shaped in cross-section, wherein two adjacent corrugations are connected together by a frame;
each of the generally U-shaped corrugations having two limbs and a web connecting the limbs;
each of the webs being planar and the limbs extending at right angles to the web when the bellows is in a neutral state; and
each of the corrugations having a layer of mesh material disposed in the limbs and web, the corrugations further having an elastomer material covering the layer of mesh material;
wherein the webs of the plurality of corrugations cooperate to provide a generally planar surface when the bellows is in a neutral state.

10. A corrugation bellows in accordance with claim 9, wherein:
each of the limbs is planar when the bellows is in a substantially neutral state.

11. A corrugation bellows in accordance with claim 9, wherein:
the layer of mesh is a first layer of mesh, each of the corrugations further having a second layer of mesh disposed in the limbs and web, the layers of mesh material being spaced apart and generally parallel to each other, the elastomer material covering and interconnecting the first and second layers of mesh material.

12. A corrugation bellows in accordance with claim 9, wherein:
the layers of mesh materials are each a continuous layer disposed in the web and the limbs.

13. A corrugation bellows in accordance with claim 9, wherein:
the mesh material is a woven or knitted material.

14. A corrugation bellows in accordance with claim 9, wherein:
the limbs and web each have a thickness in the range of 2 to 4 millimeters.

15. A corrugation bellows in accordance with claim 9, wherein:
the limbs and web have the same thickness.

16. A corrugation bellows in accordance with claim 9, wherein:
the material of the web and limbs is identical.

17. A corrugation bellows in accordance with claim 9, wherein:
the elastomer material is CSM or EPDM or a silicone rubber.

18. A corrugation bellows in accordance with claim 17, wherein:
the corrugations are vulcanized.

19. A corrugation bellows in accordance with claim 9, wherein:
the webs each remain substantially planar when the bellows is in a partially extended state.

* * * * *